United States Patent
Moreno Mengibar et al.

(10) Patent No.: US 8,473,300 B1
(45) Date of Patent: Jun. 25, 2013

(54) LOG MINING TO MODIFY GRAMMAR-BASED TEXT PROCESSING

(71) Applicants: Pedro J. Moreno Mengibar, Jersey City, NJ (US); Martin Jansche, New York, NY (US); Fadi Biadsy, Brooklyn, NY (US)

(72) Inventors: Pedro J. Moreno Mengibar, Jersey City, NJ (US); Martin Jansche, New York, NY (US); Fadi Biadsy, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/646,842

(22) Filed: Oct. 8, 2012

Related U.S. Application Data (60) Provisional application No. 61/705,997, filed on Sep. 26, 2012.

(51) Int. Cl.
*G10L 15/22* (2006.01)
*G10L 15/06* (2006.01)
*G10L 15/00* (2006.01)

(52) U.S. Cl.
USPC .......................... 704/275; 704/244; 704/257

(58) Field of Classification Search
None
See application file for complete search history.

(56) References Cited

U.S. PATENT DOCUMENTS

| | | | |
|---|---|---|---|
| 6,233,561 B1 * | 5/2001 | Junqua et al. | 704/277 |
| 6,324,512 B1 * | 11/2001 | Junqua et al. | 704/275 |
| 6,553,345 B1 * | 4/2003 | Kuhn et al. | 704/275 |
| 6,631,346 B1 * | 10/2003 | Karaorman et al. | 704/9 |
| 8,006,136 B2 | 8/2011 | Kube | |
| 8,131,548 B2 | 3/2012 | Blass | |
| 2001/0041980 A1 * | 11/2001 | Howard et al. | 704/270 |
| 2002/0087316 A1 | 7/2002 | Lee | |
| 2007/0276651 A1 | 11/2007 | Bliss | |

* cited by examiner

*Primary Examiner* — Talivaldis Ivars Smits
(74) *Attorney, Agent, or Firm* — McDonnell Boehnen Hulbert & Berghoff LLP

(57) ABSTRACT

Methods and systems for log mining for grammar-based text processing are provided. A method may comprise receiving, from a device, an activity log. The activity log may comprise one or more of an input instruction, a determined function based at least in part on a match of the input instruction to a grammar-based textual pattern including associations of a given function based on one or more grammars, and a response determination based on an acknowledgement of the determined function. The method may also comprise comparing at least a portion of the activity log with stored activity logs in order to determine a correlation between the activity log and the stored activity logs. The method may also comprise modifying the grammar-based textual pattern based on the determined correlation and providing information indicative of the modification to the device so as to update the grammar-based textual pattern.

20 Claims, 7 Drawing Sheets

LOG MINING TO MODIFY GRAMMAR-BASED TEXT PROCESSING

CROSS-REFERENCE TO RELATED APPLICATION

The present disclosure claims priority to U.S. Provisional Application No. 61/705,997, filed on Sep. 26, 2012, the entire contents of which are herein incorporated by reference.

BACKGROUND

Computing systems such as personal computers, laptop computers, tablet computers, cellular phones, among many other types of computing systems, are increasingly prevalent in numerous aspects of modern life. As computers become progressively more integrated with users' everyday life, the convenience, efficiency, and intuitiveness of the user-interfaces by which users interact with computing devices becomes progressively more important.

A user-interface may include various combinations of hardware and software which enable the user to, among other things, interact with a computing system. One example of a modern user-interface is "voice control" that may allow a user to provide speech data to a computing system in order to recognize verbal inputs. The data may be received, translated into text, and processed by the computing system, and may ultimately be used by the computing system as a basis for executing certain computing functions.

One mechanism used to facilitate recognition of verbal inputs is a grammar. A grammar may define a language and includes a syntax, semantics, rules, inflections, morphology, phonology, etc. A grammar may also include or work in conjunction with a set of word patterns, often referred to as a "grammar-based textual pattern," which may include one or more words. Speech recognition systems may use the grammar and the word patterns to recognize or otherwise predict the meaning of a verbal input (e.g., what patterns of words to expect a human to say) and, in some cases, to formulate a response to the verbal input, that may take a form of one or more computing functions.

SUMMARY

In one aspect, a method is described. The method may comprise receiving, from a device, an activity log, wherein the activity log comprises information indicative of: an input instruction, a determined function, wherein the determined function is based at least in part on a match of the input instruction to a grammar-based textual pattern, wherein the grammar-based textual pattern indicates an association of a given function based on one or more grammars, and a response determination based on an acknowledgment of the determined function. The method may further comprise comparing at least a portion of the activity log with stored activity logs so as to determine a correlation between the activity log and the stored activity logs. Still further, the method may comprise based on the correlation, determining a modification to a given association of the given function based on the one or more grammars. Yet still further, the method may comprise providing to the device information indicative of the modification to the given association of the given function based on the one or more grammars so as to update the grammar-based textual pattern.

In another aspect, a computer readable memory having stored therein instructions executable by a computing device to cause the computing device to perform functions is described. The functions may comprise receiving an activity log, wherein the activity log comprises information indicative of: an input instruction, a determined function, wherein the determined function is based at least in part on a match of the input instruction to a grammar-based textual pattern, wherein the grammar-based textual pattern indicates an association of a given function based on one or more grammars, and a response determination based on an acknowledgment of the determined function. The functions may further comprise comparing at least a portion of the activity log with stored activity logs so as to determine a correlation between the activity log and the stored activity logs. Still further, the functions may comprise based on the correlation, determining a modification to a given association of the given function based on the one or more grammars. Yet still further, the functions may comprise providing information indicative of the modification to the given association of the given function based on the one or more grammars so as to update the grammar-based textual pattern.

In yet another aspect, a system is described. The system may comprise at least one communication interface. The system may further comprise at least one processor. Still further, the system may comprise data storage comprising program instructions executable by the at least one processor for performing functions. The functions may comprise receiving, from a device, an activity log, wherein the activity log comprises information indicative of: an input instruction, a determined function, wherein the determined function is based at least in part on a match of the input instruction to a grammar-based textual pattern, wherein the grammar-based textual pattern indicates an association of a given function based on one or more grammars, and a response determination based on an acknowledgment of the determined function. The functions may further comprise comparing at least a portion of the activity log with stored activity logs so as to determine a correlation between the activity log and the stored activity logs. Still further, the functions may comprise based on the correlation, determining a modification to a given association of the given function based on the one or more grammars. Yet still further, the functions may comprise providing to the device information indicative of the modification to the given association of the given function based on the one or more grammars so as to update the grammar-based textual pattern.

These as well as other aspects, advantages, and alternatives, will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description may disclose methods and systems for log mining to modify grammar-based text processing. In one aspect, a server entity may be configured to perform the methods described herein. The server entity may be configured to receive an activity log from a client device (e.g., a mobile device). The activity log may include information identifying speech or text based data processed by the client device. In some examples, the speech-based data may include an output from a speech recognition application on the client device. The client device may work in accordance with server entity and may be configured to receive a verbal input from a user of the client device, parse the verbal input to recognize one or more words, identify one or more functions to perform associated with the recognized words, and perform the one or more functions (e.g., executing an application on the client device).

More specifically, the activity log received from the client device may include an input instruction, a determined function, and a response determination. The input instruction may include a text string (e.g., one or more words). The text string may be representative of one or more spoken utterances of a user of the client device. The determined function may be based at least in part on a classification of the input instruction, and the classification may include a matching of the input instruction to a grammar-based textual pattern. Further, the grammar-based textual pattern may include one or more associations of a given function to perform based on one or more grammars. The response determination may include an acknowledgement of the determined function. The acknowledgement may be an action taken by the user of the client device in response to an execution of the determined function by the client device. For example, a user of the client device may reject (e.g., a negative acknowledgement of the determined function) a determined function. Other examples are possible.

The server entity may also be configured to compare at least a portion of the activity log with previously stored activity logs so as to determine a correlation between the activity log and the stored activity logs. Further, based on the determined correlation, the server entity may then determine a modification to be made to a given association of the given function to perform based on the one or more grammars. In some examples, a server entity may determine that no modifications need be made to one or more given associations. After determining the modification, the server entity may provide to the client device information indicative of the modification so as to update the grammar-based textual pattern.

Systems, methods, and devices in which example embodiments may be implemented will now be described in greater detail. In general, described methods may be implemented by a computing device. In one example, a computing device may take the form of or include a server, which may receive information from and provide information to a client device, such as a mobile phone. However, the described methods may also be implemented by other computing devices, such as a personal computer or a mobile device, among others. Further, an example system may take the form of computer readable medium, which has program instructions stored thereon that are executable by a processor to provide functionality described herein. Thus, an example system may take the form of a device such as a server, or a subsystem of such a device, which includes such a computer readable medium having such program instructions stored thereon.

Figure 1:
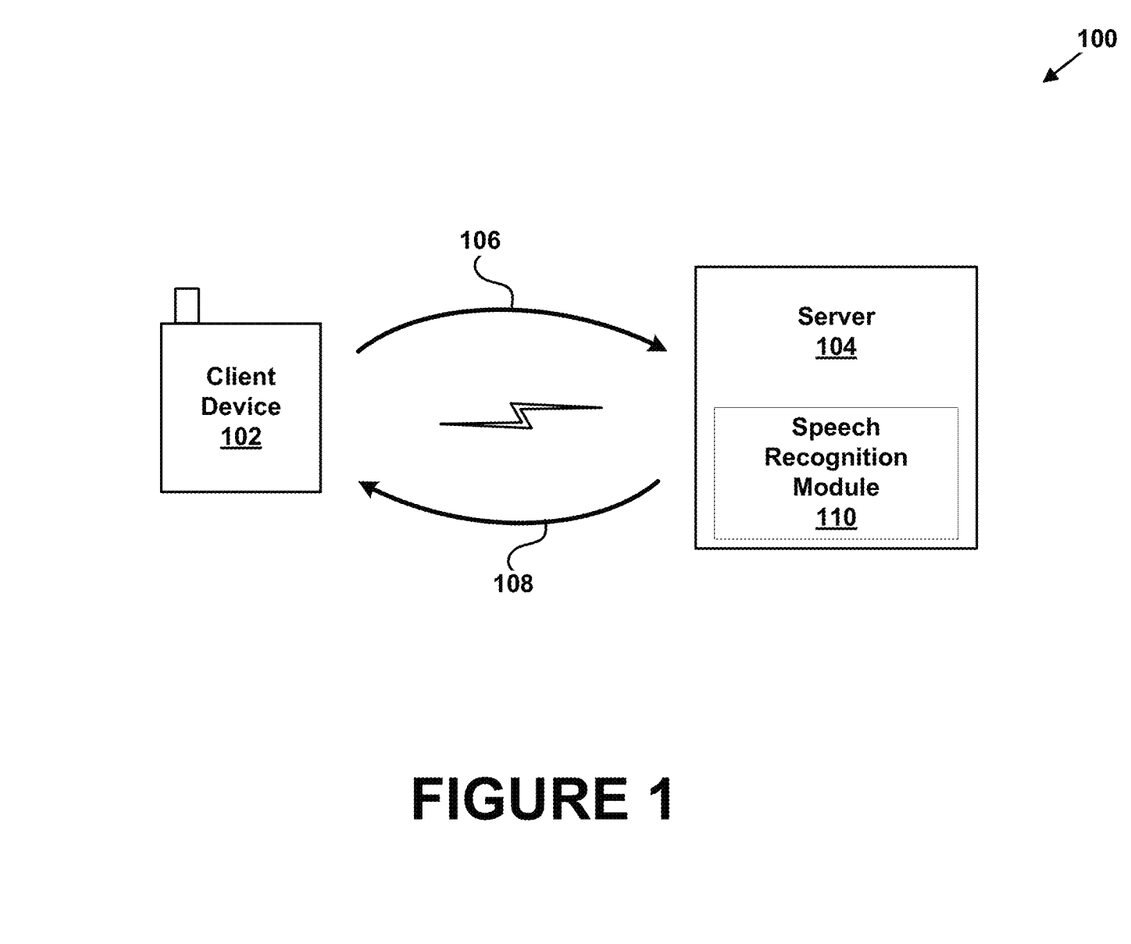
FIG. 1 illustrates an example communication system in which an example method may be implemented.

FIG. 1 illustrates an example communication system 100 in which an example method may be implemented. In FIG. 1, a client device 102 may communicate with a server 104 via one or more wired and/or wireless interfaces. The client device 102 and the server 104 may communicate within a network. Alternatively, the client device 102 and the server 104 may each reside within a respective network.

The client device 102 may be any type of computing device or transmitter including a laptop computer, a mobile telephone, or tablet computing device, etc., that is configured to transmit data 106 to or receive data 108 from the server 104 in accordance with the method and functions described herein. The client device 102 may include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

The server 104 may be any entity arranged to carry out the method and computing device functions described herein. Further, the server 104 may be configured to send data 108 to or receive data 106 from the client device 102. The server 104 may include a speech recognition module 110 (or, in some embodiments, a text recognition module) which may be configured to process the data 106 received from the client device 102. In some examples, speech or text recognition may be performed by a separate entity, or by the client device 102.

The data 106 received by the server 104 from the client device 102 may take various forms. For example, the client device 102 may send an audio recording of one or more spoken utterances of a user of the client device 102. The server 104 may then convert the audio to text and parse the text in order to identify one or more functions to perform. In another example, the client device 102 may convert the audio to text locally and then send the text information to the server 104 to be parsed. In yet another example, the client device 102 may parse the text locally, determine one or more functions to perform, execute the one or more functions, and send information indicative of the parsing, determining, and executing to the server 104. The client device 102 may also send to the server 104 a response determination indicative of an acknowledgement (e.g., a user acknowledgement) in response to the one or more determined functions. In still another example, the client device 102 may receive a textual input from a user of the client device 102 rather than a verbal input. The client device 102 may then parse the text input and send information to the server 104. Other examples are also possible.

The data 108 sent to the client device 102 from the server 104 may take various forms. For example, the server 104 may receive an input instruction, a determine function based at least in part on a match of the input instruction to a grammar-based textual pattern, and a response determination from the client device 102. The server 104 may then determine a modification to the grammar-based textual pattern and send to the client device 102 information indicative of the modification so as to update the grammar-based textual pattern. Other examples are also possible.

Figure 2:
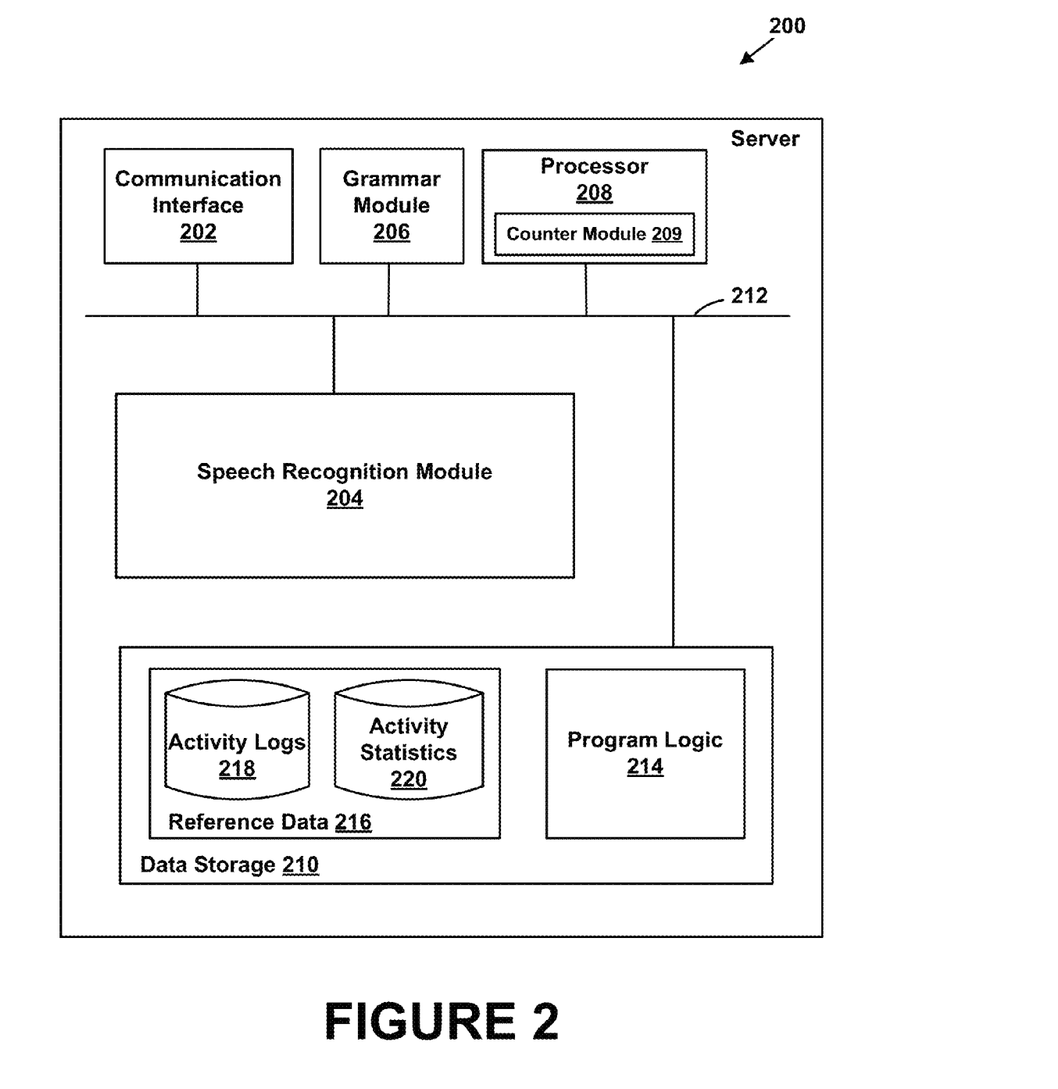
FIG. 2 illustrates a schematic drawing of an example computing device.

FIG. 2 illustrates a schematic drawing of an example computing device. In FIG. 2, the computing device takes a form of a server 200. In some examples, some components illustrated in FIG. 2 may be distributed across multiple servers. However, for the sake of example, the components are shown and described as part of one example server 200. The server 200 may be a computing device, cloud, or similar entity that may be configured to perform the functions described herein.

The server 200 may include a communication interface 202, a speech recognition module 204, a grammar module 206, a processor 208, and data storage 210. All of the components illustrated in FIG. 2 may be linked together by a communication link 212. The server 200 may also include hardware to enable communication within the server 200 and between the server 200 and another computing device (not shown). The hardware may include transmitters, receivers, and antennas, for example.

The communication interface 202 may allow the server 200 to communicate with another device (not shown), such as a mobile phone, personal computer, etc. Thus, the communication interface 202 may be configured to receive input data from one or more computing devices, and may also be configured to send output data to the one or more computing devices. In some examples, the communication interface 202 may also maintain and manage records of data received and sent by the server 200. In other examples, records of data may be maintained and managed by other components of the server 200.

The speech recognition module 204, which may also be referred to as a text recognition module, may be configured to parse a received input (such as a verbal or textual input) and match the received input to a grammar-based textual pattern, which may include one or more grammars. Grammars may be produced and/or stored by a grammar module 206. In some examples, speech or text recognition may be performed by a client device. Grammars may be produced and/or stored at the client device as well.

The processor 208 may include a counter module 209. The counter module 209 may include a counter value indicative of a number of occurrences of a correlation between an input received from the client device and previously stored inputs. The counter module 209 may be configured to increment the counter value based at least in part on the number of occurrences. In some examples, one or more functions of the server 200 may be inhibited by the counter module 209 when the counter value is less than, or exceeding, a threshold.

The data storage 210 may store program logic 214 that can be accessed and executed by the processor 206. The data storage 210 may also store reference data 216 that may be used to produce grammars or determine modifications to the grammars. The server 200 may be configured to access the reference data 216 upon receiving an input from a client device. The reference data 216 may include activity logs 218 received from one or more client devices, and activity statistics 220 determined based on comparisons made between stored activity logs 218. In some examples, the activity statistics 220 may include the counter value of the counter module 209.

In one example, the server 200 may receive an activity log from a client device. The activity log may include an input instruction. The activity log may further include a determined function, or information indicating the determined function, based at least in part on a match of the input instruction to one or more grammars. In one example, the input instruction may indicate a request made by a user of the client device for a specific application (e.g., opening a map application). In another example, the input instruction may indicate a request made by the user to take a specific action within a specific application (e.g., requesting directions from X to Y in a map application). If the verbal/textual input is successfully matched (or parsed) by the client device, the client device may send information indicating that the map application (the determined function) is successfully executed upon user request. It should be understood that the definition of a "successful matching" may vary. Several examples of such definitions will be described in later figures.

The server 200 may also receive a response determination based on an acknowledgement of the determined function. An acknowledgement may take various forms, such as a response (or lack thereof) from a user of the client device.

In some examples, after receiving the activity log, the server 200 may access the reference data 216 in order to compare the received activity log with one or more stored activity logs 218. If the determined function is accepted by the user, the server 200 may store and associate the input instruction with previous input instructions that may have been matched to the same determined function. In other examples, the server 200 may determine a statistic indicative of a rate of successful matching of varying input instructions to the same determined function. The statistic may be stored with the activity statistics 220 along with previously determined statistics and utilized at a later point in time in order to modify grammars and/or determine new statistics. Other examples are also possible.

The communication link 212 is illustrated as a wired connection; however, wireless connections may also be used. For example, the communication link 212 may be a wired serial bus such as a universal serial bus or a parallel bus. A wired connection may be a proprietary connection as well. The communication link 212 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. One or more remote computing devices may be accessible via the Internet and may include a computing cluster associated with a particular web service (e.g., social-networking, photo sharing, address book, etc.).

Figure 3:
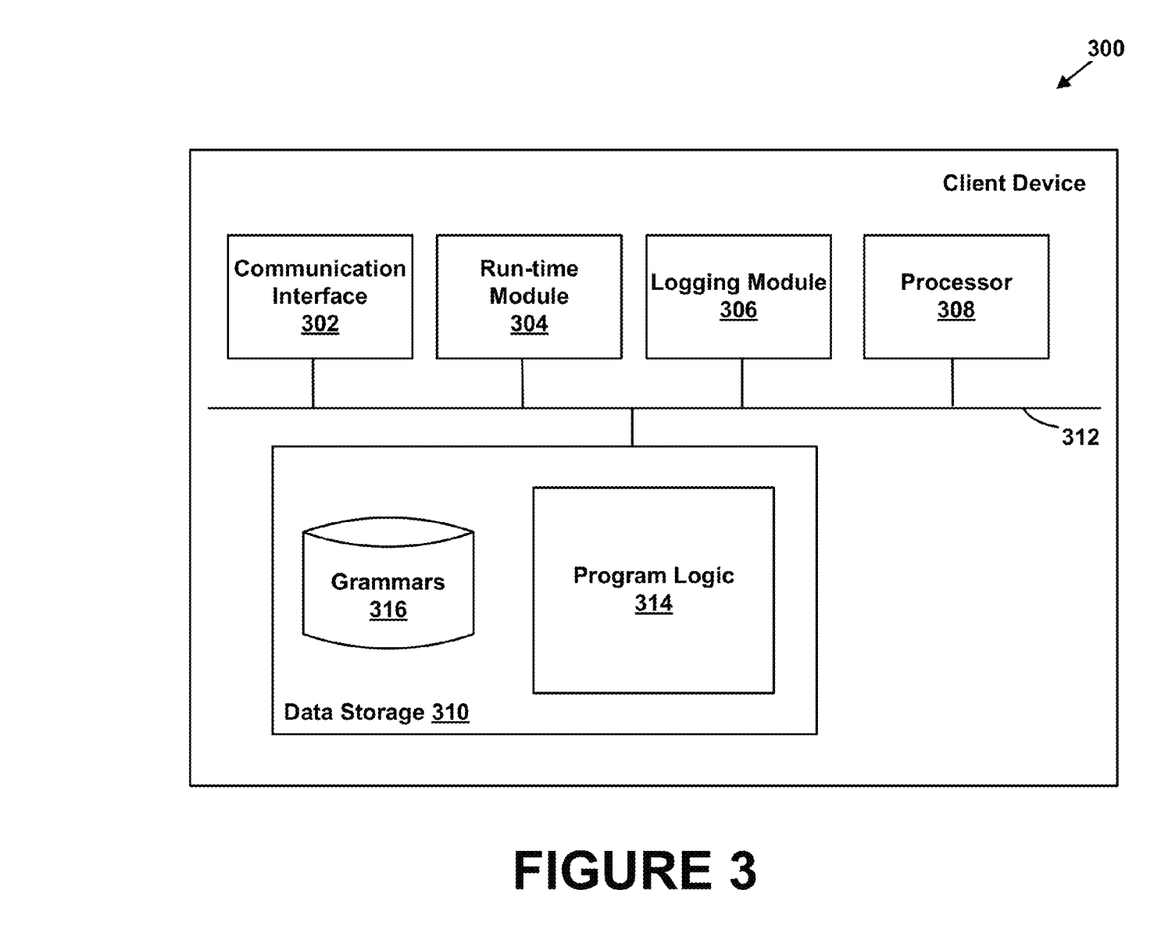
FIG. 3 illustrates a schematic drawing of another example computing device.

FIG. 3 illustrates a schematic drawing of another example computing device 300. In FIG. 3, the computing device takes a form of a client device 300. In some examples, some components illustrated in FIG. 3 may be distributed across multiple computing devices. However, for the sake of example, the components are shown and described as part of one example client device 300. The client device 300 may be a mobile device, desktop computer, email/messaging device, tablet computer, or similar device that may be configured to perform the functions described herein.

The client device 300 may include a communication interface 302, a run-time module 304, a logging module 306, a processor 308, and data storage 310. All of the components illustrated in FIG. 3 may be linked together by a communication link 312. The client device 300 may also include hardware to enable communication within the client device 300 and between the client device 300 and another computing device (not shown), such as a server entity. The hardware may include transmitters, receivers, and antennas, for example.

The communication interface 302 may allow the client device 300 to communicate with another computing device (not shown), such as a server. Thus, the communication interface 302 may be configured to receive input data from one or more computing devices, and may also be configured to send output data to the one or more computing devices. In some examples, the communication interface 302 may also maintain and manage records of data received and sent by the client device 300. In other examples, records of data may be maintained and managed by other components of the client device 300.

The run-time module 304 may be configured to perform grammar-based textual pattern matching utilizing grammars which may be provided by the server. In one example, the run-time module 304 may perform speech/text recognition functions locally at the client device 300, similar to the speech recognition module 204 described in FIG. 2. In another example, the run-time module may only be configured to receive a textual input (also referred to as an input instruction) from a separate module configured to convert a verbal input into the textual input. It should be understood, that the functions performed by the run-time module 304 may be divided between the client device 300 and one or more servers in a particular network. However, strictly client-side and/or purely server-side run-time functions are possible as well. In some examples, the run-time module 304 may utilize a given grammar in order to parse a textual input. By parsing the textual input, the run-time module 304 may perform argument identification along with pattern classification. Argument identification may include assigning one or more arguments to one or more portions of the given textual input. Pattern classification may include assigning a function to perform to a given textual input. The parsing of a textual input may take various forms, and several examples of which will be described in later figures.

The run-time module 304 may perform grammar-based/rule-based textual pattern matching using a variety of techniques, such as by use of finite state machines, algorithms, or other techniques known by those having ordinary skill in the art. In some examples, the run-time module may be configured to perform speech recognition as well.

After parsing the textual input, the run-time module 304 may send an output comprising a record of the textual input and the result of the parsing of the textual input to the logging module 306 configured to store the output received from the run-time module 304. The logging module 306 may also be configured to store one or more portions of the textual input, including any portion that may not have been successfully parsed due to one or more incorrect grammars. In some examples, the logging module 306 may store data locally at the client device 300. In other examples, the logging module 306 may store data remotely at another computing device. The logging module 306 may then send data to the server to be processed so as to update grammars associated with the textual input. Modifications may often be made to an incorrect grammar when an unsuccessful parsing occurs due to the incorrect grammar. The logging module 306 may store and organize the data received from the run-time module 304.

The data storage 310 may store program logic 314 that can be accessed and executed by the processor 308. The data storage 310 may also store grammars 316 utilized by the run-time module 304.

The communication link 312 is illustrated as a wired connection; however, wireless connections may also be used. For example, the communication link 312 may be a wired serial bus such as a universal serial bus or a parallel bus. A wired connection may be a proprietary connection as well. The communication link 312 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. One or more remote computing devices may be accessible via the Internet and may include a computing cluster associated with a particular web service (e.g., social-networking, photo sharing, address book, etc.).

Figure 4:
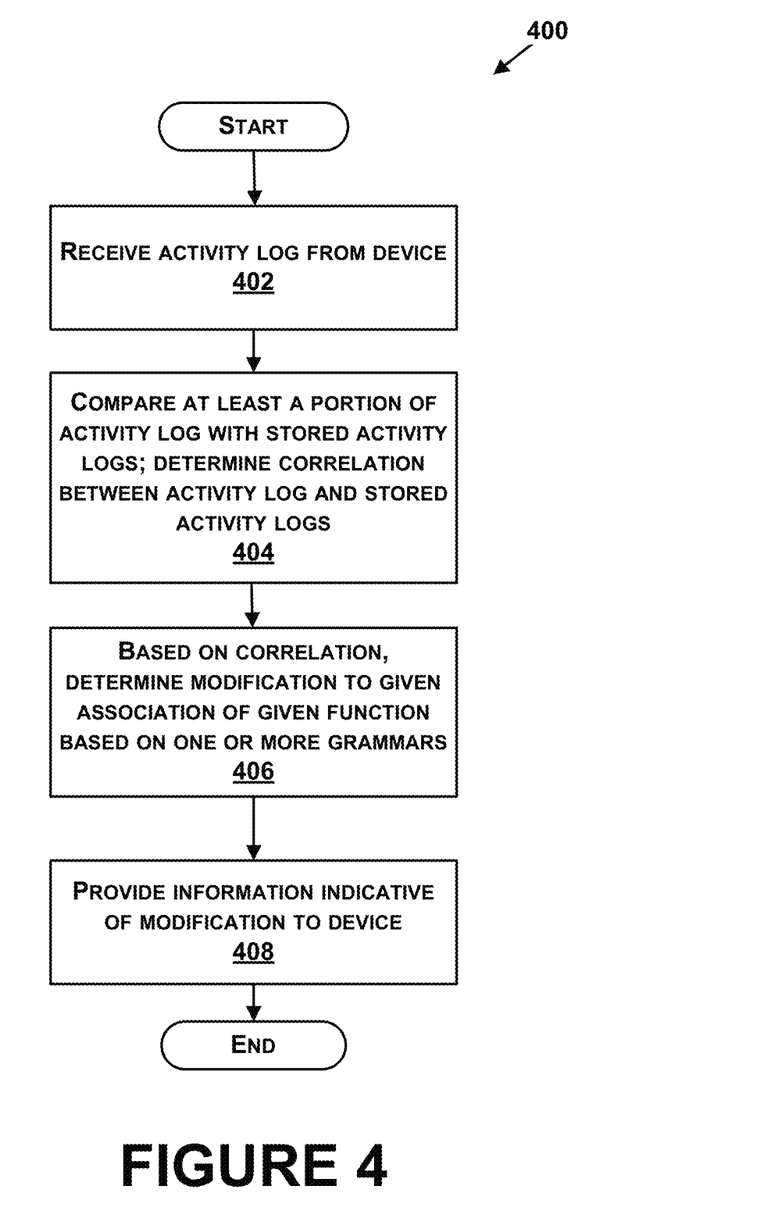
FIG. 4 depicts a flow chart of an example method.

FIG. 4 depicts a flow chart of an example method. Method 400 may include one or more operations, functions, or actions as illustrated by one or more of blocks 402-408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

For the sake of example, the method shown in FIG. 4 will be described as implemented by a server in communication with a client device. It should be understood that other entities can implement one or more steps of the example method.

Initially, at block 402, the method includes receiving an activity log from a device. In one example, the server may receive an activity log from the client device. The activity log may include an input instruction in the form of a text string, such as "driving directions to New York City." The activity log may further include a determined function based at least in part on a match of the input instruction to one or more grammars. In this example, the client device may have received a verbal input of the phrase "driving directions to New York City" and performed the matching prior to sending the activity log to the server. The input instruction may indicate a request made by a user of the client device for a specific application, such as a map application in this example. If the input instruction is successfully matched (or parsed, or classified) by the client device, the client device may send information indicating that the map application (the determined function) is successfully opened in accordance with a user's request. Further, if the input is successfully matched, the map application may provide directions to New York City from the user's current location to the user. A successful grammar-based textual pattern matching of an input instruction may depend on one or more grammars used by a run-time module of a client device. A successful matching may be defined as a matching of one or more portions of the input instruction with a given function to perform, irrespective of whether the given function to perform is a function desired by a user of the client device. One or more functions performed by the client device based on the input instruction provided by the user may not agree with the actual intentions of the user.

In some examples, a "parsing" of an input instruction may refer to a classification of one or more portions of the input instruction Referring to the input instruction, "driving directions to New York City," the run-time module may include one or more grammars for a portion of the textual input, "New York City." The grammar associated with "New York City" may differ depending on other portions of the input instruction. For example, the portion of the input instruction, "driving directions," may be classified as a MODE associated with a function to perform (i.e., a NAVIGATE function), and "New York City" may be classified as a DESTINATION based on the "driving directions" portion of the input instruction, which indicates that a user of the client device may envision "New York City" as a destination to which the user wishes to travel rather than simply a location. In another example, an activity log may include an input instruction, "Where is New York City?" In this example, the "Where is" portion of the input instruction may be classified as a MODE associated with a function to perform (e.g., a LOCATE function), and "New York City" may be classified as a LOCATION based on the portion of the input instruction "Where is" (or possibly just "Where"), which indicates that a user of the client device may envision "New York City" as a location that the user wishes to see on a map in a map application (e.g., via a dropping of a pin at the requested location, New York City, on a map).

However, in another example, a user may desire a map displaying driving directions to New York City, yet the user may provide an input instruction of "Where is New York City?" In this example, depending on one or more grammars used, the run-time module may associate the input instruction with a LOCATE function rather than a NAVIGATE function that the user desired. In other examples, "Where is" may be classified as a MODE associated with a NAVIGATE function to perform rather than a LOCATE function to perform. It is also possible that a grammar may not exist for a given input instruction. Alternatively, a grammar may be incomplete, thus resulting in an unsuccessful matching. For example, in the absence of a grammar associated with "driving directions" and/or "New York City," the input instruction may not be associated with a function to perform. Other examples are also possible.

Still referring to block 402, the activity log may further include a response determination based on an acknowledgement of the determined function. For example, the determined function of the input instruction, "driving directions to New York City" may include a NAVIGATE function. In this example, the user of the client device may provide a positive acknowledgement of the determined function if the user desired that the NAVIGATE function be performed. The response determination may indicate the positive acknowledgement. The NAVIGATE function may cause the map application to open and display driving directions from a current location of the user to New York City, and a positive acknowledgement may result from the user leaving the map application open rather than closing the map application. Alternatively, the user may not have desired that the NAVIGATE function be performed, to which the user may respond by subsequently closing the map application. The closing of the map application may include a response determination indicative of a negative acknowledgement of the determined function. In general, a response determination may include any action taken by a user of a client device responsive to a determined function being initiated or performed.

At block 404, the method includes comparing at least a portion of the received activity log with stored activity logs so as to determine a correlation between the activity log and the stored activity logs. More specifically, the comparing may comprise comparing one or more portions of the activity log with one or more portions of at least one stored activity log.

In one example, an activity log may comprise an input instruction of "navigate to New York City," a determined function of NAVIGATE, and a response determination based on a negative acknowledgement of the determined function by a user of a client device. In this example, the response determination may indicate that the determined function was not desired or accepted by the user. A server may then compare the activity log with stored activity logs to determine a history of response determinations corresponding to input instructions similar to "navigate to New York City." For example, at least one stored activity log may comprise the same input instruction and the same determined function, but a response determination based on a positive acknowledgement of same determined function rather than a negative acknowledgement. Further, the at least one stored activity log may indicate that at least one user of a client device (a different user of a different client device, or possibly the same user of the same client device) accepted the determined function of NAVIGATE in response to a similar input instruction.

It should be understood that "similar input instruction" may indicate that at least one portion of a first input instruction may be identical to at least one portion of a second input instruction. In some examples, a first input instruction may only be compared with a second input instruction if more than one portion of the first input instruction is identical to a second input instruction. The methods which are used to compare input instructions, determined functions, and response determinations may vary. In general, a variety of methods may be used to determine which stored activity logs to use in the comparing.

In some examples, a server may associate a confidence score with a given grammar-based textual pattern. The confidence score may be representative of a rate at which a determined function is accepted (via a response determination). For example, a majority of users may have accepted a given determined function based on a match of a given input instruction with a given grammar-based textual pattern. Thus, a high confidence score may be determined for the given grammar-based textual pattern. Further, a server may then receive a new activity log comprising the given input instruction and a response determination based on a negative acknowledgement of the given determined function. Although the new activity log indicates that a user did not accept the given determined function and therefore did not accept the match of the given input instruction to the given grammar-based textual pattern, the high confidence score may be used as an indicator that the given grammar-based textual pattern is in good form and no modification is needed. Alternatively, a low confidence score for the given grammar-based textual pattern may be used as an indicator that the given grammar-based textual pattern requires a modification.

In other examples, a server may associate a confidence score with at least one given grammar associated with a given function to perform, rather than with a given grammar-based textual pattern which includes one or more grammars collectively associated with a given function to perform. In still other examples the server may include a counter configured to count activity logs that comprise one or more similar characteristics. The counter may include a given threshold, which may be calibratable. Further, a modification to a given grammar-based textual pattern may be inhibited or prevented until the counter exceeds the given threshold. Other examples are also possible.

At block 406, the method includes, based on the correlation determined in block 404, determining a modification to a given association of the given function to perform based on the one or more grammars. At block 408, the method includes providing information indicative of the modification to the given association of the given function to perform so as to update the grammar-based textual pattern.

For example, a user may provide an input instruction, "open my calendar," and a portion of the input instruction, "open," may be associated with a determined function in which a calendar application is executed on the client device and provides the user with a window in which to edit a new event for the calendar. An activity log comprising the input instruction may be compared with stored activity logs and correlation may be determined. Based on the correlation, the server may modify the association of the portion of the input instruction, "open," with the function to perform (possibly through a modification of one or more grammars) such that the portion of the input instruction, "open" may be associated with a new function to perform in which a calendar application opens without providing the user with a window in which to edit a new event for the calendar. The server may then provide, to the client device, information indicative of the modification, thus updating the grammar-based textual pattern. Therefore, future input instructions similar to "open my calendar" may then be matched with the updated grammar-based textual pattern such that the portion of the input instruction "open" may be associated with the new function to perform. Other examples are also possible.

Figure 5A:
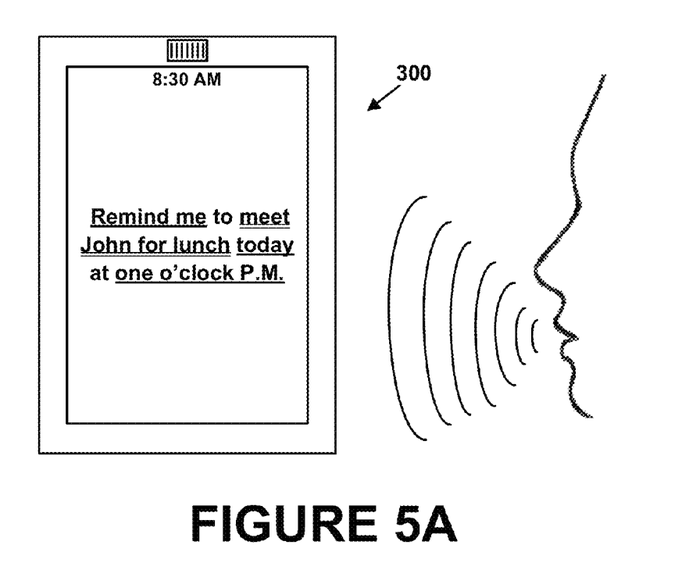
FIGS. 5A-5C illustrate example computing devices performing functions in accordance with an example method.
Figure 5B:
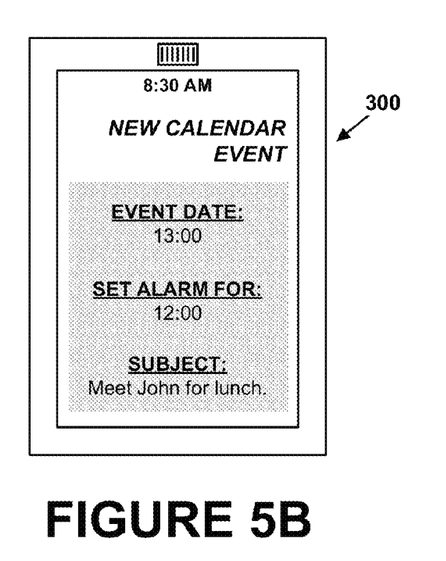
Figure 5C:
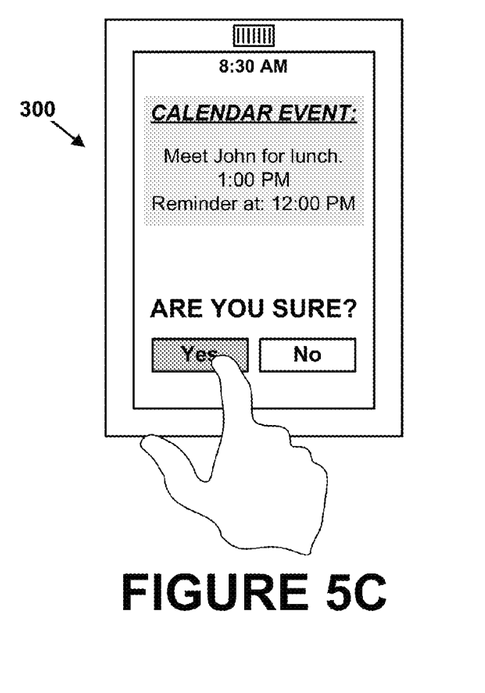

FIGS. 5A-5C illustrate example computing devices performing functions in accordance with an example method. For the illustrated examples, the computing device shown includes the client device 300 described in FIG. 3, but it should be understood that the computing device may take other forms and/or may include components different than those illustrated in FIG. 3.

FIG. 5A illustrates a user of a client device 300 providing a verbal input to the client device 300. The verbal input may be converted to an input instruction in which the input instruction includes a text string representative of one or more utterances of the user of the client device 300. The run-time module (which located locally at the client device 300, for this example) may parse and match the input instruction to a given grammar-based textual pattern. The input instruction illustrated in FIG. 5A, "Remind me to meet John for lunch today at one o'clock P.M.," may be classified by associations of one or more functions to perform based on one or more grammars. In this example, multiple portions of the input instruction may each be associated with a respective function based on the one or more grammars. The logging module of the client device 300 may store an activity log comprising the input instruction and information indicative of the parsing of the input instruction. Other information may be stored as well.

FIG. 5B illustrates a determined function based at least in part on the matching of the input instruction to the given grammar-based textual pattern. The entirety of the input instruction may be associated with the determined function in which a calendar application on the client device 300 opens and allows the user to create a new calendar event. Further, "Remind me" may be recognized as a MODE associated with a function to perform, SET ALARM, "today" and "one o'clock" may be recognized as a DATE, and "meet John for lunch" may be recognized as a SUBJECT. Still further, portions including words such as "to" and "at" may be ignored by a parser, yet such words may be stored by a run-time module of the client device 300 at a logging module of the client device 300.

In some examples, the given grammar-based textual pattern may not recognize/classify all portions of the input instruction. Further, a server may modify (in accordance with the methods and functions described herein) a given association of a given function to perform based on one or more grammars so as to update a given grammar-based textual pattern such that all portions of the input instruction may be matched. Referring to the example illustrated in FIG. 5A, a server may continuously receive activity logs from a plurality of client devices in which a portion of the input instruction may not be recognized, such as the "Remind me" portion. The activity logs may indicate, via respective determined functions and respective response determinations, that users of the plurality of client devices may desire to set an alarm for a new event added to a calendar, and the server may modify given associations so as to associate "Remind me" with a function to perform, SET ALARM.

FIG. 5C illustrates a response determination based on an acknowledgement of the determined function. In this example, the user of the client device 300 provides a positive acknowledgement indicative of an accepted determined function. A server may then receive, from the client device 300, the activity log comprising the input instruction, the determined function, and the response determination.

FIGS. 6A-6D illustrate other example computing devices performing functions in accordance with an example method. For the illustrated examples, the computing device shown includes the client device 300 described in FIG. 3, but it should be understood that the computing device may take other forms and/or may include components different than those illustrated in FIG. 3.

Figure 6A:
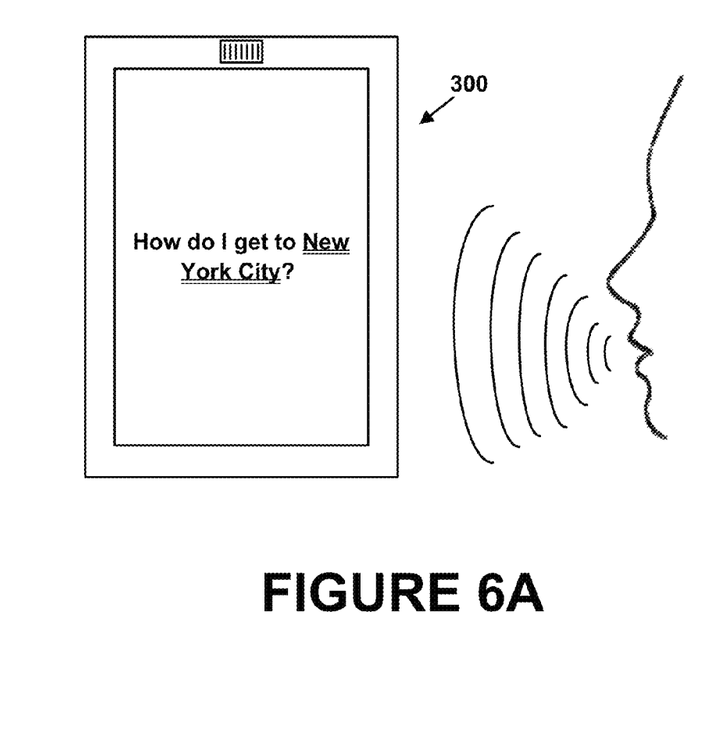
FIGS. 6A-6D illustrate other example computing devices performing functions in accordance with an example method.

Referring to FIG. 6A, a user of a client device 300 may provide a verbal input verbal input to the client device 300 and the verbal input may be converted to an input instruction in which the input instruction includes a text string representative of one or more utterances of the user of the client device 300. The input instruction, "How do I get to New York City" may be classified by associations of one or more functions to perform based on one or more grammars. The run-time module may match only a portion of the input instruction to a grammar-based textual pattern. In the illustrated example, the portion, "New York City," may be classified as a LOCATION, but other portions of the input instruction may not be classified. In some examples, "How do I get to" may be classified as a MODE associated with a function to perform, LOCATE. In other examples, a lack of a classification of a portion of the input instruction, such as "How do I get to," may result in a default function to perform (e.g., LOCATE) based on another portion that was classified, such as "New York City." As a result of the matching, the determined function may include the client device 300 opening a map application and locating New York City on a map.

In some examples, the determined function based on a matching of the portion, "New York City," may include the client device 300 opening an internet browser and displaying one or more images of New York City. In other examples, the grammar-based textual pattern matched to the portion, "New York City," may determine other functions to perform. Further, the grammar-based textual pattern matched to the input instruction may be modified by a server based on comparisons between one or more activity logs and determined correlations between the one or more activity logs so as to determine the other functions to perform.

Figure 6B:
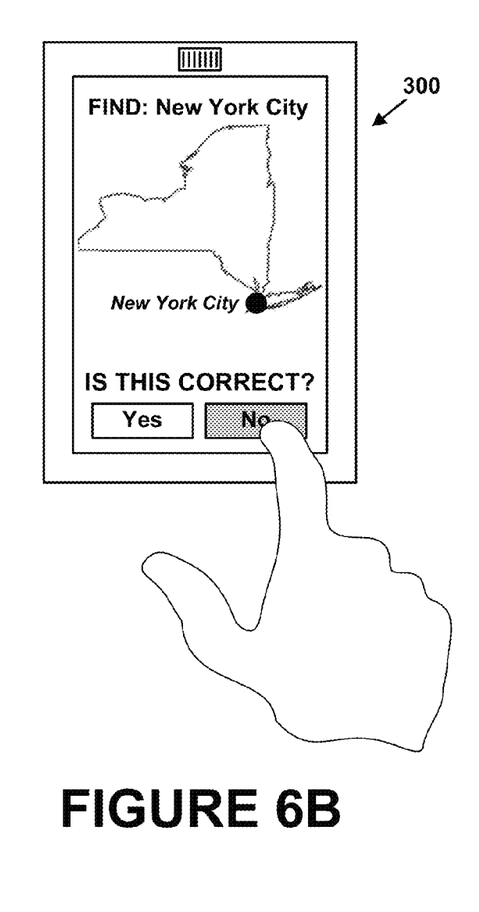

FIG. 6B illustrates a response determination based on an acknowledgement of the determined function. In this example, the user of the client device 300 provides a negative acknowledgement indicative of a rejection of the determined function. The server may then receive, from the client device 300, the activity log comprising the input instruction, the determined function, and the response determination. The server may compare the received activity log with stored activity logs that may comprise similar input instructions, determined functions, and/or response determinations. For example, one or more stored activity logs may comprise, for example, an input instruction, a determined function, and a response determination as illustrated in FIGS. 6C-6D.

In some examples, the grammar-based textual pattern originally matched with the input instruction, "How do I get to New York City?" may be modified based on a comparing of the activity log with a plurality of stored activity logs. Further, the plurality of stored activity logs may comprise a plurality of response determinations indicative of a rejection of a determined function (e.g., locating New York City on a map). Still further, a counter coupled to the server may count the plurality of response determinations. The server may also determine other statistics indicative of the rejection of the determined function. The grammar-based textual pattern may be modified based on a correlation between the activity log and the stored activity logs, and the correlation may be based at least in part on the counter and/or the other determined statistics.

Figure 6C:
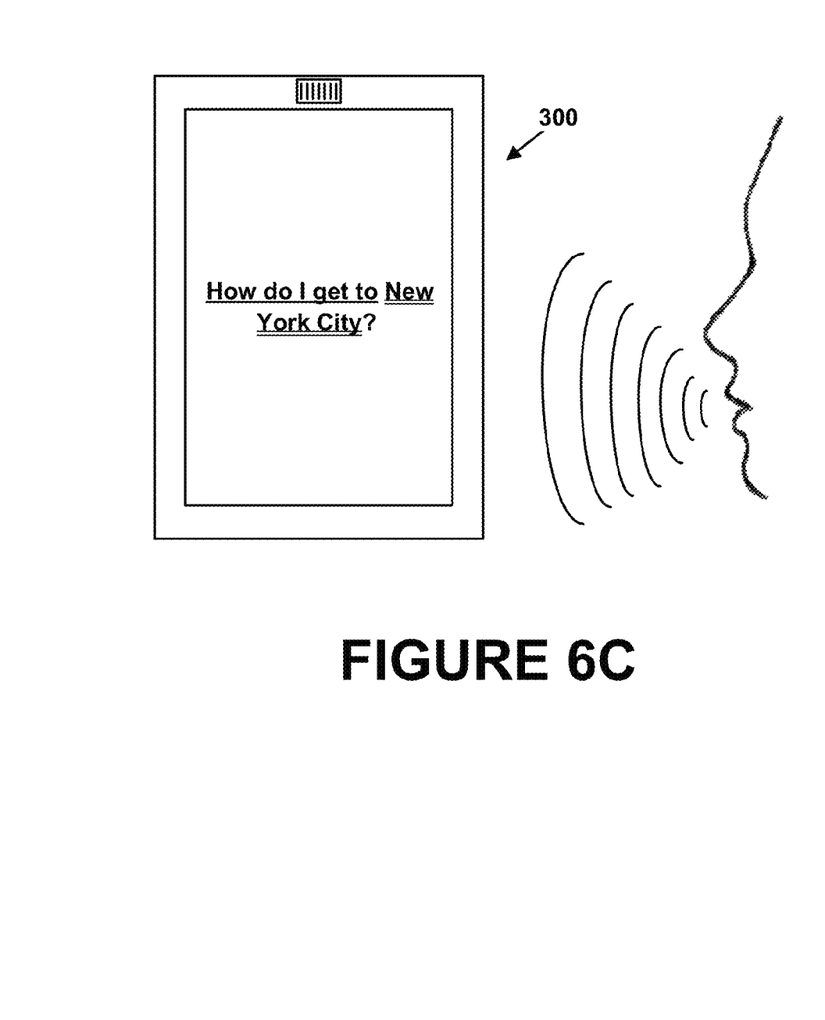
Figure 6D:
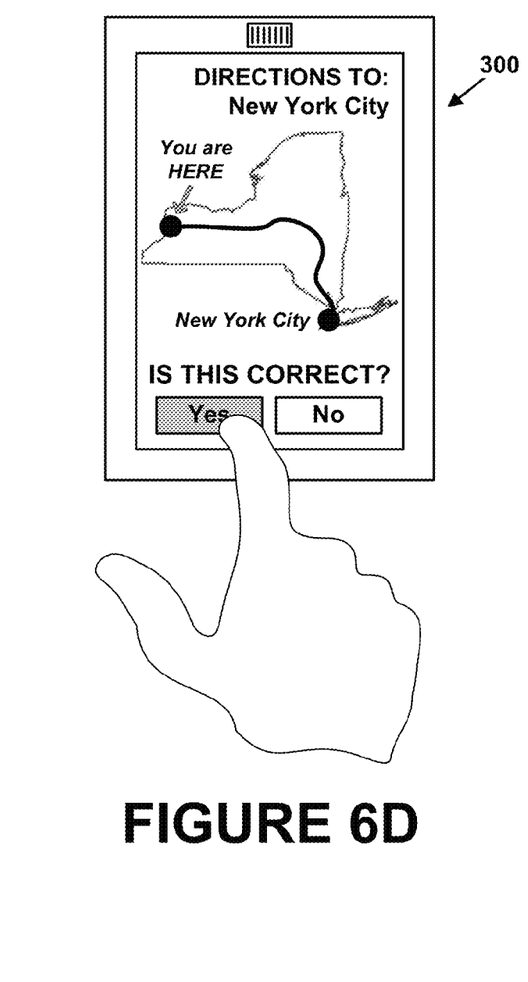

Referring to FIGS. 6C-6D, the grammar-based textual pattern of FIGS. 6A-6B may be modified so as to classify the portion of the input instruction, "How do I get to," as a MODE associated with a function to perform, NAVIGATE, such that the determined function may include the client device 300 opening the map application and providing directions to the user to New York City from the user's current location. The user may then provide a response determination based on a positive acknowledgement of the determined function, as illustrated in FIG. 6D.

In some examples, a grammar-based textual pattern may lack of one or more associations of a given function based on one or more grammars, thus resulting in a user rejection of the given function to perform. However, by implementation of the described method 400, an association may be added. In some examples, an association may be removed. In other examples, an association based on a grammar may be replaced by a new association based on a new grammar. In still other examples, an association based on a grammar may be replaced by a new association based on a new function to perform. Other examples are also possible.

In one example, a user may provide an input instruction, "edit schedule for Tuesday." In this example, the user may intend to add a new event to a calendar via a calendar application on a client device. The input instruction may be matched to a given grammar-based textual pattern resulting in a determined function in which a calendar application opens and displays Tuesday's schedule to the user. The user may then promptly close the calendar application, thus providing a response determination based on a negative acknowledgement of the determined function. The determined function may indicate that a portion of the input instruction, "schedule for Tuesday" was matched with the given grammar-based textual pattern, but the portion "edit" (or possibly "edit schedule") was not recognized and/or matched.

Further, the server may receive an activity log comprising the input instruction, the determined function, and the response determination, and compare the activity log to stored activity logs. A comparison may be made to one or more respective activity logs comprising a respective input instruction, "edit calendar," which resulted in an accepted determined function in which a calendar application opened and allowed a user to add a new event to a calendar. As a result of the comparison, a modification may be made to a given association (or, in this case, a lack of an association) of the given function to perform (or, in this case, a lack of a function to perform) based on one or more grammars. More specifically, the modification may ensure that "edit schedule" results in the same determined function as "edit calendar," in which a calendar application opened and allowed a user to add a new event to a calendar. Therefore, an input instruction, "edit schedule for Tuesday," may open a calendar application, display Tuesday's schedule to a user, and allow the user to add a new event to Tuesday's schedule.

In some examples, a server may employ (in addition to, or alternative to, the methods and functions disclosed herein) complex machine-learning and natural language processing algorithms (e.g., a part of speech tagger, a syntactic parser, a named entity tagger, etc.) configured to modify grammars and grammar-based textual patterns based on input data received in an activity log, such as portions of an input instruction that may have been successfully matched by a run-time module of a client device, and portions of the input instruction that may not have been successfully matched by the run-time module of a client device.

In some examples, a correlation determined by comparing an activity log to stored activity logs may be indicative of an input instruction that is commonly provided by users of client devices. Additionally or alternatively, the correlation determined by comparing an activity log to stored activity logs may be indicative of a determined function and a response determination that are commonly provided by users of client devices. Further, multiple users may desired the same determined function, yet the multiple users may provide input instructions that differ from each other. As a result, each respective input instruction may be matched to a respective grammar-based textual pattern, and each respective grammar-based textual pattern may result in varying determined functions. Over a period of time, a server may receive activity logs from client devices of the multiple users and compare each activity log so as to provide an updated grammar-based textual pattern that may determine a function to perform that is accepted by a majority of users. By implementing the methods and functions described herein, a server may learn from each received activity log via comparisons and correlations between each received activity log and one or more stored activity logs.

In some examples, one or more stored activity logs at a server may include a training set of activity logs. The training set of activity logs may include activity logs predetermined by human input prior to the server receiving any activity logs from one or more client devices. After production of the server begins, the server may be configured to compare received activity logs with the training set of activity logs so as to build a larger database of stored activity logs. Unlike activity logs received from client devices, the training set of activity logs may include data that does not depend on grammar-based textual patterns. For example, the server may be initially configured to classify all input instructions including the text, "directions," as a MODE associated with a function to perform, NAVIGATE, which may cause a map application to open and display driving directions from a current location of the user to any LOCATION determined from the input instruction based on a parsing of the input instruction. Further, the classification of input instructions including the text, "directions," may change based on activity logs received from client devices after the initial configuration of the server including the training set of activity logs. In other examples, one or more stored activity logs may be validated and maintained by humans. Human input may also be used to validate one or more statistics determined based on the one or more stored activity logs. Other examples are also possible.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

We claim:

1. A method, comprising:
    receiving, from a device, an activity log, wherein the activity log comprises information indicative of:
        an input instruction,
        a determined function, wherein the determined function is based at least in part on a match of the input instruction to a grammar-based textual pattern, wherein the grammar-based textual pattern indicates an association of a given function based on one or more grammars, and
        a response determination based on an acknowledgment of the determined function;
    comparing at least a portion of the activity log with stored activity logs so as to determine a correlation between the activity log and the stored activity logs;
    based on the correlation, determining a modification to a given association of the given function based on the one or more grammars; and
    providing to the device information indicative of the modification to the given association of the given function based on the one or more grammars so as to update the grammar-based textual pattern.

2. The method of claim 1, wherein the input instruction includes a text string representative of one or more spoken utterances.

3. The method of claim 1, wherein the determined function is further based at least in part on a match of one or more portions of the input instruction to the one or more grammars.

4. The method of claim 1, further comprising based on the response determination, associating a confidence score with a given grammar-based textual pattern.

5. The method of claim 4, wherein determining the correlation between the activity log and the stored activity logs is based at least in part on the confidence score.

6. The method of claim 1, wherein the acknowledgment of the determined function includes an acknowledgement indicative of a rejection of the determined function.

7. The method of claim 1, wherein the modification to the given association of the given function based on the one or more grammars includes one or more of a removal of an association, a replacement of an association with a new association based on a new grammar, a replacement of an association with a new association based on a new function, and an addition of an association.

8. A computer readable medium having stored thereon instructions executable by a computing device to cause the computing device to perform functions comprising:
    receiving an activity log, wherein the activity log comprises information indicative of:
        an input instruction,
        a determined function, wherein the determined function is based at least in part on a match of the input instruction to a grammar-based textual pattern, wherein the grammar-based textual pattern indicates an association of a given function based on one or more grammars, and
        a response determination based on an acknowledgment of the determined function;
    comparing at least a portion of the activity log with stored activity logs so as to determine a correlation between the activity log and the stored activity logs;
    based on the correlation, determining a modification to a given association of the given function based on the one or more grammars; and
    providing information indicative of the modification to the given association of the given function based on the one or more grammars so as to update the grammar-based textual pattern.

9. The computer readable medium of claim 8, wherein the computing device includes at least one server entity.

10. The computer readable medium of claim 9, wherein the stored activity logs include one or more activity logs stored locally at the at least one server entity.

11. The computer readable medium of claim 8, wherein the input instruction includes a text string representative of one or more spoken utterances.

12. The computer readable medium of claim 8, wherein the acknowledgement of the determined function includes a subsequent command, of which possibilities are based at least in part on the determined function.

13. The computer readable medium of claim 8, wherein the function of receiving the response determination comprises receiving information indicative of an acceptance of the determined function.

14. The computer readable medium of claim 8, wherein the activity log is based at least in part on previous information indicative of one or more previous modifications provided.

15. A system, comprising:
    at least one communication interface;
    at least one processor; and
    data storage comprising program instructions executable by the at least one processor for performing functions comprising:
        receiving, from a device, an activity log, wherein the activity log comprises information indicative of:
            an input instruction,
            a determined function, wherein the determined function is based at least in part on a match of the input instruction to a grammar-based textual pattern, wherein the grammar-based textual pattern indicates an association of a given function based on one or more grammars, and
            a response determination based on an acknowledgment of the determined function;
        comparing at least a portion of the activity log with stored activity logs so as to determine a correlation between the activity log and the stored activity logs;
        based on the correlation, determining a modification to a given association of the given function based on the one or more grammars; and
        providing to the device information indicative of the modification to the given association of the given function based on the one or more grammars so as to update the grammar-based textual pattern.

16. The system of claim 15, wherein the modification to the given association of the given function based on the one or more grammars includes one or more of a removal of an association, a replacement of an association with a new association based on a new grammar, a replacement of an association with a new association based on a new function, and an addition of an association.

17. The system of claim 15, wherein determining the correlation between the activity log and the stored activity logs is based at least in part on a confidence score, wherein the confidence score is associated with a given grammar-based textual pattern.

18. The system of claim 15, further comprising a counter coupled to the processor, wherein the counter includes a counter value indicative of a number of occurrences of the correlation between the activity log and the stored activity logs.

19. The system of claim 18, wherein the counter is configured to increment the counter value based at least in part on the number of occurrences.

20. The system of claim 18, further comprising program instructions executable by the at least one processor for performing functions, the functions comprising determining the modification to the given association of the given function based on the one or more grammars when the counter value exceeds a threshold.

\* \* \* \* \*